Sept. 22, 1959 C. G. SÖDERBAUM 2,905,766

SELECTIVE SWITCH FOR TELEPHONE INSTRUMENTS IN
INTERCOMMUNICATING TELEPHONE SYSTEMS

Filed Jan. 22, 1957

INVENTOR
CARL GUSTAF SÖDERBAUM

BY Hane and Nydick
ATTORNEYS

United States Patent Office 2,905,766
Patented Sept. 22, 1959

2,905,766

SELECTIVE SWITCH FOR TELEPHONE INSTRUMENTS IN INTERCOMMUNICATING TELEPHONE SYSTEMS

Carl Gustaf Söderbaum, Stockholm, Sweden, assignor to Telefonaktiebolaget L M Ericsson, Stockholm, Sweden, a corporation of Sweden Application January 22, 1957, Serial No. 635,380
Claims priority, application Sweden January 30, 1956
10 Claims. (Cl. 179—90)

The invention relates to a selective switch with a rotating switching member movable over contacts in a contact bank. With such instruments the subscriber usually sets the number wanted by rotating an actuating member e.g. a wheel provided on the front side of the instrument. With such instruments, it is desirable to use a dial for obtaining the proper setting. The dials now in general use, can be provided with 12 finger holes. However, telephone instruments with selective switches are often designed for considerably more than 12 connections, and a dial with 12 holes is therefore not enough. According to the present invention it is possible to use a 12-holes dial for instruments with up to 24 connections. It is, therefore, an object of the present invention to provide a dial, which is rotatable in both directions in which the angular pitch for the holes in said dial is twice as great as the angular pitch for the contacts in the contact bank.

Another object of the invention is to provide a dial mechanism having two stop faces provided a finger-stop member for the dial, which member is displaceable between two end positions spaced apart a distance from each other corresponding to ½ angular pitch of the holes so that the movements of the dial clockwise is stopped when the finger inserted in a hole in the dial strikes against one of said stop faces on the stopping member and said last mentioned member occupies a first one of its end positions, while the movements of the dial counter-clockwise is stopped, when the finger strikes against the other stop face of the finger-stop member, and the stopping instrument occupies its second end position.

Figure 1:
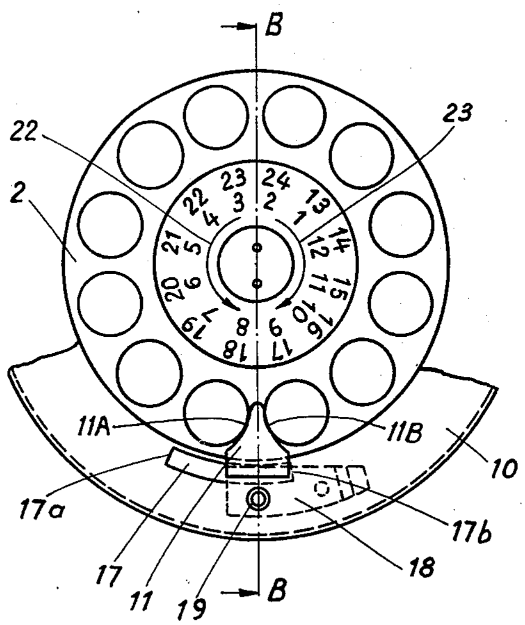
Figure 2:
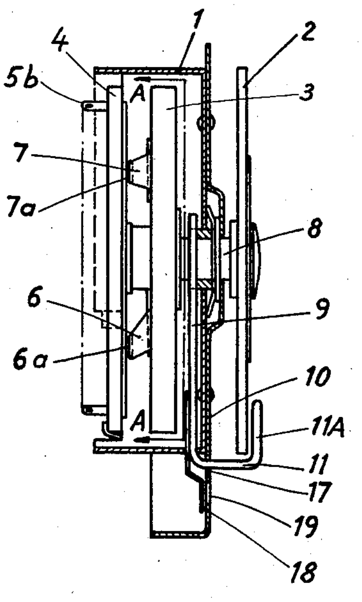
Figures 3, 4:
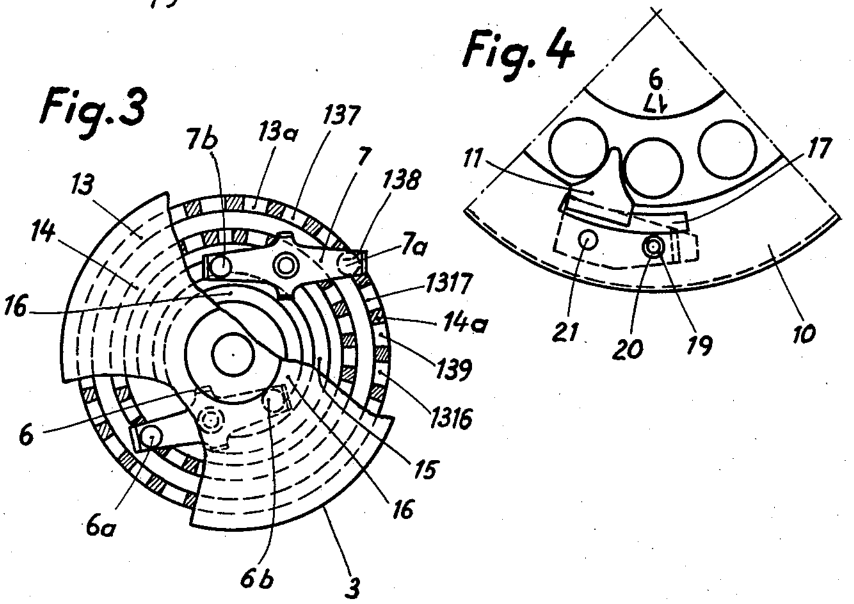

The invention is to be further described according to the attached drawing, in which: Fig. 1 is a front view of the selective switch, Fig. 2 a section along the line B—B in Fig. 1 and Fig. 3 a section along the line A—A in Fig. 2. Fig. 4 shows a part of Fig. 1 with the stop member for the dial in another position.

In the drawing, 1 represents a cover, which encloses the different parts, 2 represents the finger hole-plate, supported by and fixed to the shaft 8, to which latter also is fixed a circular disk 3, upon which are attached two arms 6 and 7, each supporting two electrically connected sliding contacts *6a, b,* and *7a, b,* respectively, which sliding contacts slide over circular contact banks 13—16 arranged on a plate 4 of insulating material. Two of these contact banks 13, 14 each include 24 metallic contact pieces, e.g. 1317, to which external connection is made through soldering tabs *5b* (Fig. 2) and which are separated by 24 insulation pieces *14a*. The other contact banks 15 and 16 each comprise an annular metal plate. The sliding contacts *6a* and *7a* slide, in response to rotation of the dial, against the contacts of the contact banks 14, 13, respectively, while the sliding contacts *6b* and *7b* slide against the metal plate 16, 15 respectively, to which last mentioned the wires of the one telephone instrument are connected, while one of the wires of each of the remaining instruments belonging to the system is connected to a contact in the bank 13 and the second wire thereof connected to a contact in the bank 14. The angular pitch for the finger holes of the dial is twice as great as the angular pitch for the connection contacts in banks 13 and 14, so that when the dial is turned one hole-pitch the sliding contacts *6a* and *7a* are turned two contact-pitches. A finger-stop member 11 for the dial is provided with two finger stop faces 11A and 11B—one for each direction of rotation of said dial—and is supported by an arm 9 (Fig. 2), which is frictionally mounted upon the shaft 8 in such a way that the arm with the stopping member 11, in response to rotation of the dial in each turning direction, is moved an amount corresponding to ½ hole pitch on the dial. The stop member 11 is passed through a recess 17 in a covering plate 10 which is riveted to the cover 1 enclosing the switch. The movement of the stop member 11 in response to rotation of the dial is limited by the edges *17a* and *b* on the recess 17 (Fig. 1). To the arm 9, supporting the stopping member 11, is fixed an arm 18, bent so that it lies immediately under the covering plate 10 (Figs. 2 and 4) that defines a window 19. On the upper side of the arm 18 there are two markings, e.g. a red surface 21 and a black surface 20 (Fig. 4), of which the red surface is shown in the window 19 in the covering plate when the stop member 11 is turned counter-clockwise to one of its end positions (Fig. 1)—in which the movement is limited by the edge *17b*—and the black surface is shown in the window 19, when the stop member is turned clockwise to its second end position (Fig. 4). Upon setting the selective switch, which is done by means of the finger-holes of the plate, the plate is turned counter-clockwise, to set the switch on an instrument number in the 1–12 series, but clockwise, if setting is to be done on a number in the 13–24 series. If desired, the 1–12 series can be marked with red digits and the 13–24 series with black figures, and further a red arrow 22 indicates that the dial, upon selecting a red figure, is to be turned counter-clockwise, and a black arrow 23, that the dial is to be turned clockwise upon selection of a black figure. The position shown in Fig. 1 shows, that the subscriber has chosen the Figure 8 and has turned the dial counter-clockwise until the finger struck against the left curved edge of the stop member 11. The contacts *6a* and *7a* in the arms 6 and 7 thereby being set on those contacts in the contact banks 13 and 14, to which the subscriber No. 8 is connected, sliding contact *7a* in the arm 7 is then supposed to be standing on contact 138. If the subscriber now wishes to set the switch on another number, e.g. No. 7, the finger is inserted in the hole No. 7 and is turned counter-clockwise, until the finger strikes the left curved edge of the stop member 11. The plate 2 has then been turned counter-clockwise one hole pitch and the sliding contact *7a* has been turned so it stands on the contact 137, to which the subscriber No. 7 is connected. If the switch instead is to be set on No. 17 (with out-going from the shown position in Fig. 1), the finger is inserted in the corresponding hole and the plate is turned clockwise, the finger thereby moving forward the stop member 11 until said member strikes against the edge *17a* (Fig. 1). The plate and the stop member have thereby only been turned ½ hole pitch clockwise, and the sliding contact *7a* then makes connection with contact No. 1317. If instead the Figure 16 had been chosen, the plate and the stop member would at first be turned clockwise ½ pitch, the instrument would be stopped by the edge *17a*, and the plate would be turned one more pitch clockwise, causing the sliding contact *7a* to be moved to the contact No. 1316. If the subscriber wishes to choose No. 9, the plate is turned counter-clockwise 11 pitches and so on Half the number of contacts in the contact banks 13 and 14 are intended for the numbers 1–12 and the other half for the numbers 13–24 to every second contact in the contact bank 13 (resp. 14) are thus connected to those subscribers lines, having such figures on the dial which require the turning of the dial in one direction and to the remaining contacts the lines whose figures require turning of the dial in the other direction. When the subscriber has taken a figure in the 1–12 series (red figures) and the stopping member 11 is turned to its right end position shown in Fig. 1 a red marking 21 can be seen in the window 19, and when the subscriber has taken a figure in the 13–24 series (black figures) a black marking 20 can be seen in the window 19 (Fig. 4).

The contact *6a* on the contact arm 6 is turned and set on the associated contact bank 14 at the same time as the arm 7.

It is of course not necessary to have a black and a red marking for the figures. Another marking may be used which indicates for the subscriber, that at setting of the switch on certain numbers, the plate is to be turned clockwise and at setting on other numbers counterclockwise.

It has been indicated, that the stop member 11 is mounted with friction on the shaft 8 and is turned with the shaft when the latter is turned. This is not necessary—the stop member could be loosely mounted on the shaft 8, as will in any way be adjusted from the one to the second of its end positions by the action of the finger, which at the turning of the plate 2, strikes against the stop member and moves the same.

I claim:

1. A selective switch for telephone instruments in intercommunicating telephone systems, said switch comprising, in combination, a circular set of fixed bank contacts, wiping contacts for movement along said circular path, said wiping contacts being attached to a dial finger hole plate mounted for a rotary shift movement, the angular pitch of the holes in said hole plate being twice as great than the angular pitch of said bank contacts, a finger stop member in the path of rotation of a dialing member, said stop member being displaceable between two end positions, the distance between said two end positions corresponding to one half of the angular pitch for the holes in said hole plate, said finger stop member preventing at the first end position rotation into one direction of said finger hole plate by said dialing member when said dialing member abuts said finger stop member, said finger stop also preventing at the second end position rotation into the other direction of said finger hole plate by said dialing member placed in a finger hole when said dialing member abuts said finger stop member.

2. A switch as set forth in claim 1 and further comprising an arm, said finger stop being carried upon one end of said arm, the other end of said arm being pivoted upon a shaft common to said finger plate, said arm being supported for rotation frictionally upon said shaft, whereby said finger stop is displaced between said end positions in response to a rotation of said finger hole plate.

3. A switch as set forth in claim 1 and further comprising an arm, said finger stop being supported upon one end of said arm, the other end of said arm being pivotally supported upon a shaft common to said finger hole plate, said arm being pivotally mounted upon said shaft, whereby said finger stop is displaceable between said end positions in response to abutment therewith by said dialing member.

4. A switch as set forth in claim 1 and further comprising pairs of different characters inscribed upon said finger hole plate, each pair of said characters being associated with a single one of said finger holes, one character of each said pair of characters having one color pertaining to one respective fixed contact, the other character of each said pair being of a color different from that of said one character and pertaining to another respective fixed contact, said finger plate being rotatable into one direction to effect movement of said wiping contact into electrical connection with a fixed contact pertaining to a character of said one color, and said finger plate being rotatable into the opposite direction to displace said wiping contact into electrical connection with a fixed contact pertaining to a character of said other color.

5. A switch as set forth in claim 4 and further comprising an arrow inscribed on said finger plate in said one color and pointing into said one direction.

6. A switch as set forth in claim 4 and further comprising a color indicating device responsive to movement of said finger stop, said color indicating device displaying one of said colors in response to movement of said finger stop to one of said end positions, and said color indicating device displaying the other one of said colors in response to movement of said finger stop into the other one of said end positions.

7. A selective switch for telephone instruments in intercommunicating telephone systems comprising, in combination, a base, circumferentially spaced apart fixed bank contacts supported upon said base, a dial finger plate having a plurality of circumferentially spaced apart finger receiving openings rotatably supported upon said base, wiping contacts adjustably carried by said dial finger hole plate for movement around said set of circumferentially spaced apart contacts, said finger receiving openings being spaced apart an angular distance equal to twice the angular distance between said fixed bank contacts, a finger stop member adjustably supported upon said base in overlying relationship with said finger receiving openings of said finger plate for movement between opposite end positions spaced apart a distance substantially equal to one-half of the angular distance between said finger receiving openings in said finger plate whereby said finger stop is movable toward one end position into limiting abutment with a digit within one of said finger plate holes in response to rotation of said finger plate into an opposite direction.

8. A selective switch as set forth in claim 7 wherein said finger stop comprises an arm, a shaft rotatably supporting said finger plate upon said base, a finger abutting stop carried on one end of said arm, the opposite end of said arm being frictionally secured to said shaft for rotation therewith and relatively rotatable therewith in response to a continued rotation of said finger plate of said finger stop into one of said opposite end positions.

9. A selective switch as set forth in claim 7 wherein said finger stop comprises an arm, a shaft rotatably supporting said finger plate upon said base, a finger abutting stop carried upon one end of said arm, the opposite end of said arm being freely rotatably supported upon said shaft, said stop being rotatable in response to abutment of a digit therewith during rotation of said finger plate.

10. A selective switch as set forth in claim 7 wherein each said wiping contact comprises a pair of contact elements, said fixed bank contacts for each said wiping contact including an annular metal plate and a circular set of circumferentially spaced apart banking contacts, and means for effecting movement of said wiping contacts into engagement with a predetermined one of each set of banking contacts in response to a rotation of said finger plate into one direction and for effecting movement of said wiping contacts into engagement with predetermined other ones of each set of said bank contacts in response to rotation of said finger plate into the opposite direction.

References Cited in the file of this patent

UNITED STATES PATENTS

| | | |
|---|---|---|
| 2,063,009 | Andriano | Dec. 8, 1936 |
| 2,433,347 | Deakin | Dec. 30, 1947 |

FOREIGN PATENTS

| | | |
|---|---|---|
| 83,591 | Sweden | June 12, 1935 |